United States Patent [19]
Funk et al.

[11] Patent Number: 6,043,780
[45] Date of Patent: Mar. 28, 2000

[54] ANTENNA ADAPTER

[76] Inventors: Thomas J. Funk, 4680 White Rock Cir., #4, Boulder, Colo. 80301; David Maldonado, 3321 Ash St., San Diego, Calif. 92102

[21] Appl. No.: 08/758,865

[22] Filed: Dec. 2, 1996

Related U.S. Application Data

[63] Continuation-in-part of application No. 08/579,170, Dec. 27, 1995, abandoned, which is a continuation of application No. 08/873,286, Jun. 11, 1997, Pat. No. 5,959,583.

[51] Int. Cl.⁷ .................................................. H01Q 1/24
[52] U.S. Cl. ............................ 343/702; 343/906; 455/575
[58] Field of Search ........................... 343/702, 860, 343/906; 455/575; H01Q 1/24

[56] References Cited

U.S. PATENT DOCUMENTS

| | | | |
|---|---|---|---|
| 4,031,468 | 6/1977 | Ziebell et al. | 325/312 |
| 4,286,335 | 8/1981 | Eichler et al. | 455/89 |
| 5,158,483 | 10/1992 | Fishman et al. | 439/668 |
| 5,357,262 | 10/1994 | Blaese | 343/906 |
| 5,524,284 | 6/1996 | Marcou et al. | 455/90 |

FOREIGN PATENT DOCUMENTS

| | | | |
|---|---|---|---|
| 0331435 | 9/1989 | European Pat. Off. | H04B 1/38 |
| 0412852 | 2/1991 | European Pat. Off. | H04B 1/38 |

*Primary Examiner*—Michael C. Wimer
*Attorney, Agent, or Firm*—Philip R. Wadsworth; Roger W. Martin; Christopher O. Edwards

[57] ABSTRACT

An antenna adapter for interfacing a portable radiotelephone with external equipment. In a preferred embodiment, a connector assembly includes a first connector portion that inserts directly into the radiotelephone's antenna port, replacing the normal antenna assembly. Matching electrical components on a circuit board are used to match the impedance of the antenna port of the portable radiotelephone. A second connector portion typically uses conventional RF connectors to couple the radiotelephone antenna port to external equipment.

17 Claims, 7 Drawing Sheets

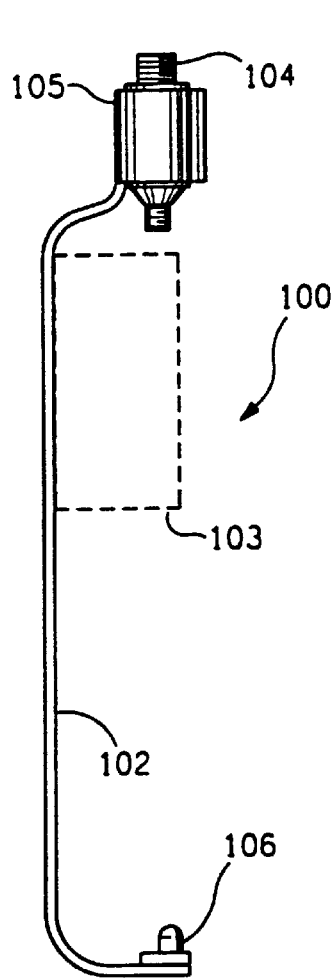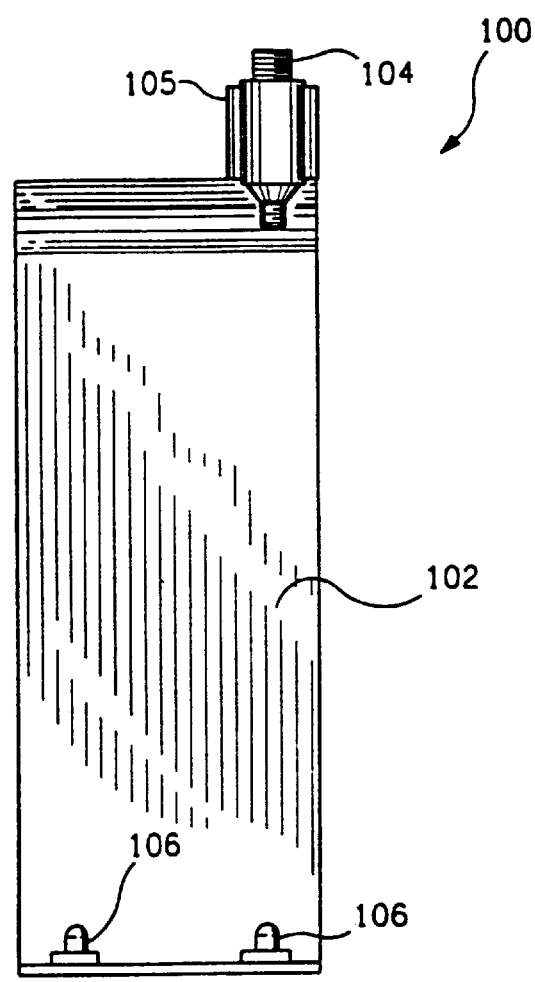
FIG. 1A
FIG. 1B

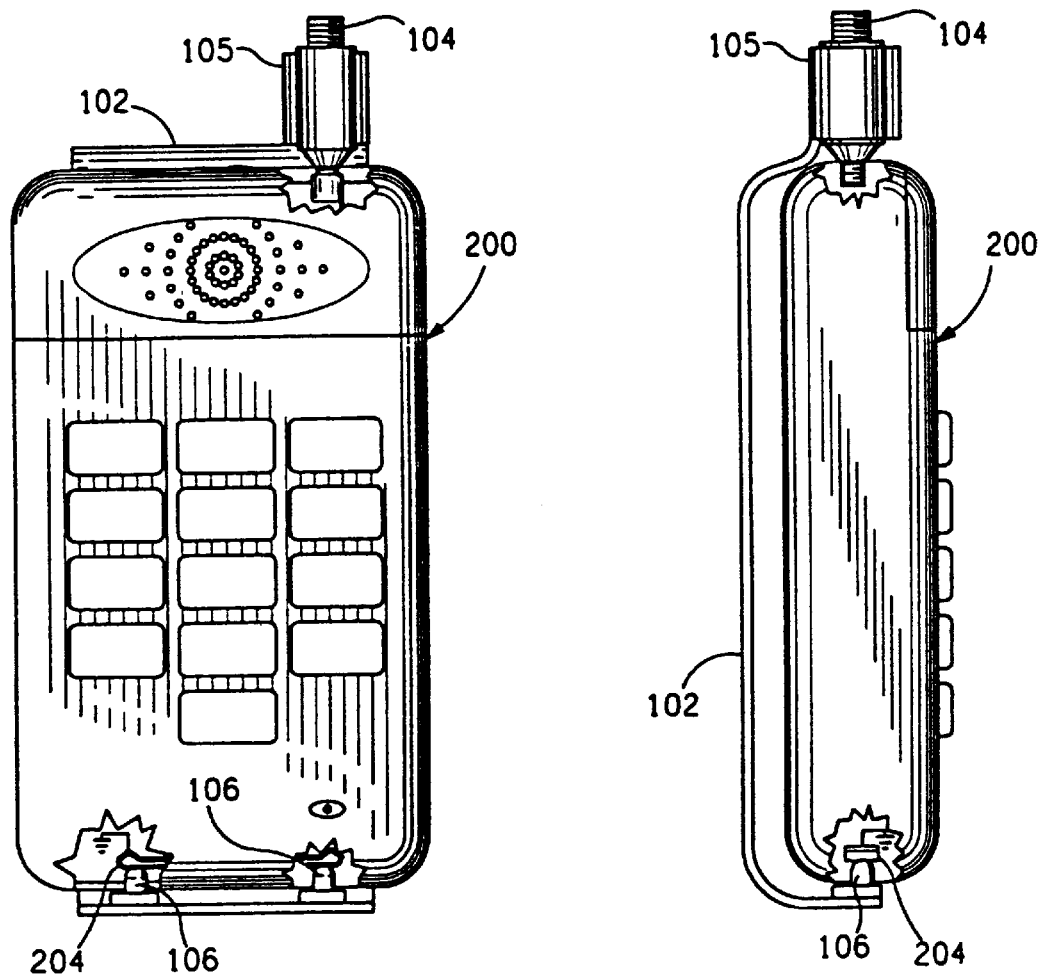

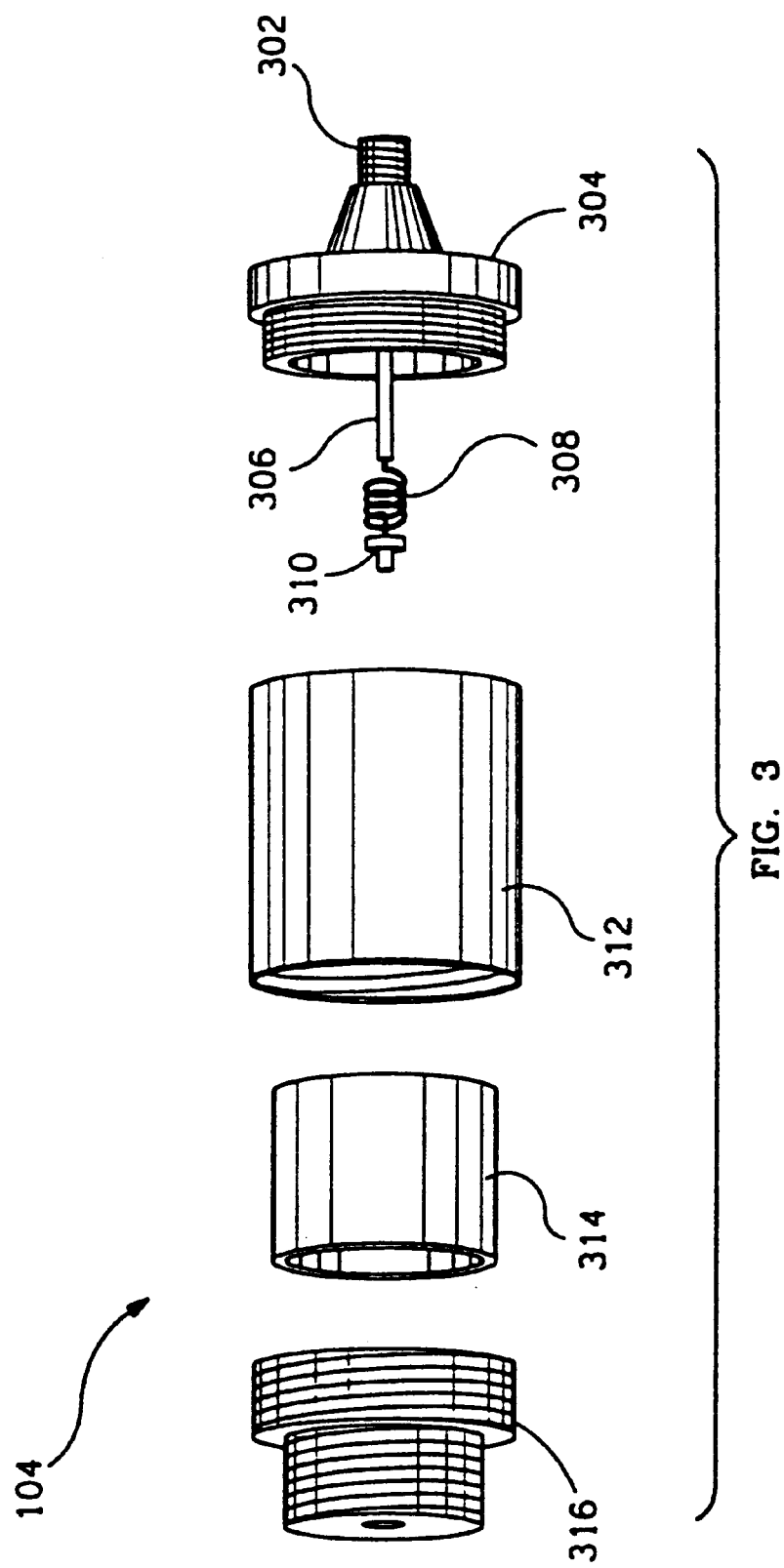

ANTENNA ADAPTER

CROSS-REFERENCE TO RELATED APPLICATION

The present application is a continuation-in-part of U.S. patent application Ser. No. 08/579,170, filed on Dec. 27, 1995 abandoned which was filed as a file wrapper continuation Ser. No. 08/873,286, now U.S. Pat. No. 5,859,583 filed Jun. 11, 1997.

BACKGROUND OF THE INVENTION

1. Field of the Invention

The present invention relates to radio-frequency (RF) test equipment for portable radiotelephones. More particularly, the present invention relates to a novel and improved adapter for interfacing a portable radiotelephone with RF test equipment.

2. Description of the Related Art

In the field of cellular communications, portable radiotelephones are used to communicate with base stations over radio-frequencies (RF). As these portable radiotelephones are manufactured, they are typically tested at various stages of production. For example, the individual circuit card assemblies of the radiotelephone are typically tested for functionality and component integrity individually at the "card-level," and in combination at the "subassembly-level," as the portable radiotelephone is assembled. This production typically occurs in a factory setting, where much of the testing is automated, and the circuit cards which will eventually be enclosed in the radiotelephone housing may be substantially exposed. With the radiotelephone circuit cards substantially exposed, access to various test points on the circuit cards is conveniently accommodated. However, once the portable radiotelephone is fully assembled, the circuit cards and other components are typically fully enclosed in the radiotelephone housing, preventing convenient access to the internal portions of the radiotelephone.

It is often desirable to test the RF performance of the radiotelephone under controlled conditions after it is fully assembled, both alone and in conjunction with an associated base station. Additionally, it is often desirable to test the performance of the associated base station itself by interfacing the RF signal of one or more portable radiotelephones directly to the base station. Typically, once the radiotelephone is fully assembled the only access to the RF signal generated by the radiotelephone is at the antenna port. However, there is typically no RF return path available at the antenna port itself because the antenna is normally a simple dipole. Without convenient access to the internal portions of the radiotelephone, it becomes very difficult to interface the radiotelephone to any desired RF test equipment without "jury-rigging" awkward and cumbersome test setups. For example, one solution to the problem would be to create a "virtual ground" by using a large piece of double-sided circuit board to serve as an RF return path. In such a setup, the antenna port could be connected to the top side of the circuit board, with the bottom side serving as the virtual ground. However, such a test setup is impractical due to its large and awkward size, its inability to be calibrated for predictability in testing, high RF signal leakage, and unacceptable RF signal attenuation across the circuit board.

What is needed is an assembly for interfacing a fully-assembled portable radiotelephone with RF test equipment which is small in size, rugged in construction, and easy to use. Such an RF test equipment interface assembly must provide an RF return path which exhibits low RF signal attenuation, i.e., insertion loss, as well as low radiated emission levels.

SUMMARY OF THE INVENTION

The present invention is embodied in an apparatus for interfacing a radiotelephone with external equipment where the radiotelephone has an external ground and an antenna removably coupled to an antenna port. The apparatus comprises an electrically conductive elongated member having first and second ends and a circuit board assembly attached to the elongated member at the first end. A connector assembly is coupled to the circuit board assembly and has a first connector portion to connect to the antenna port when the radiotelephone antenna is removed, and a second connector portion to connect to the external equipment. The circuit board assembly also includes electrical components mounted thereon, intermediate the first and second connector portions to match an impedance with the antenna port. The electrical components couple the first and second connector portions. The apparatus also includes an electrical contact assembly coupled to the elongated member at the second end for contacting the external ground of the radiotelephone when the radiotelephone is mechanically engaged with the elongated member.

In one embodiment, the apparatus further comprises a connector clip coupled to the circuit board assembly to capture the first connector portion such that the first connector portion is rotatable about a longitudinal axis. The rotatable connector portion simplifies the insertion of the first connector portion into the antenna port. The first connector portion may also include a substantially cylindrical projection extending from the first connector portion along a longitudinal axis thereof. The projection has a predetermined length to interface with the antenna port.

The electrical components mounted on the circuit board assembly may comprise passive electrical components to match the antenna port impedance and a selected frequency band. The electrical components may comprise at least a first inductor and a first capacitor. The elongated member can be advantageously sized to receive and mechanically engage the portable radiotelephone with the first connector portion and the electrical contact assembly providing mechanical engagement of the apparatus with the radiotelephone. The electrical contact assembly may comprise at least one electrically conductive pin and at least one electrically non-conductive pin. In an exemplary embodiment, the second connector portion comprises an impedance-matched coaxial connector, such as an SMA connector having an impedance of substantially 50 ohms.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1A is a side view of the antenna adapter of the present invention;

FIG. 1B is a front view of the antenna adapter of the present invention;

FIG. 2A is a partially broken-away front view of a portable radiotelephone employing the antenna adapter of the present invention;

FIG. 2B is a partially broken away side view of a portable radiotelephone employing the antenna adapter of the present invention;

FIG. 3 is a partially disassembled side view of an exemplary embodiment of an RF connector of the present invention;

DETAILED DESCRIPTION OF THE PREFERRED EMBODIMENTS

Figure 4:
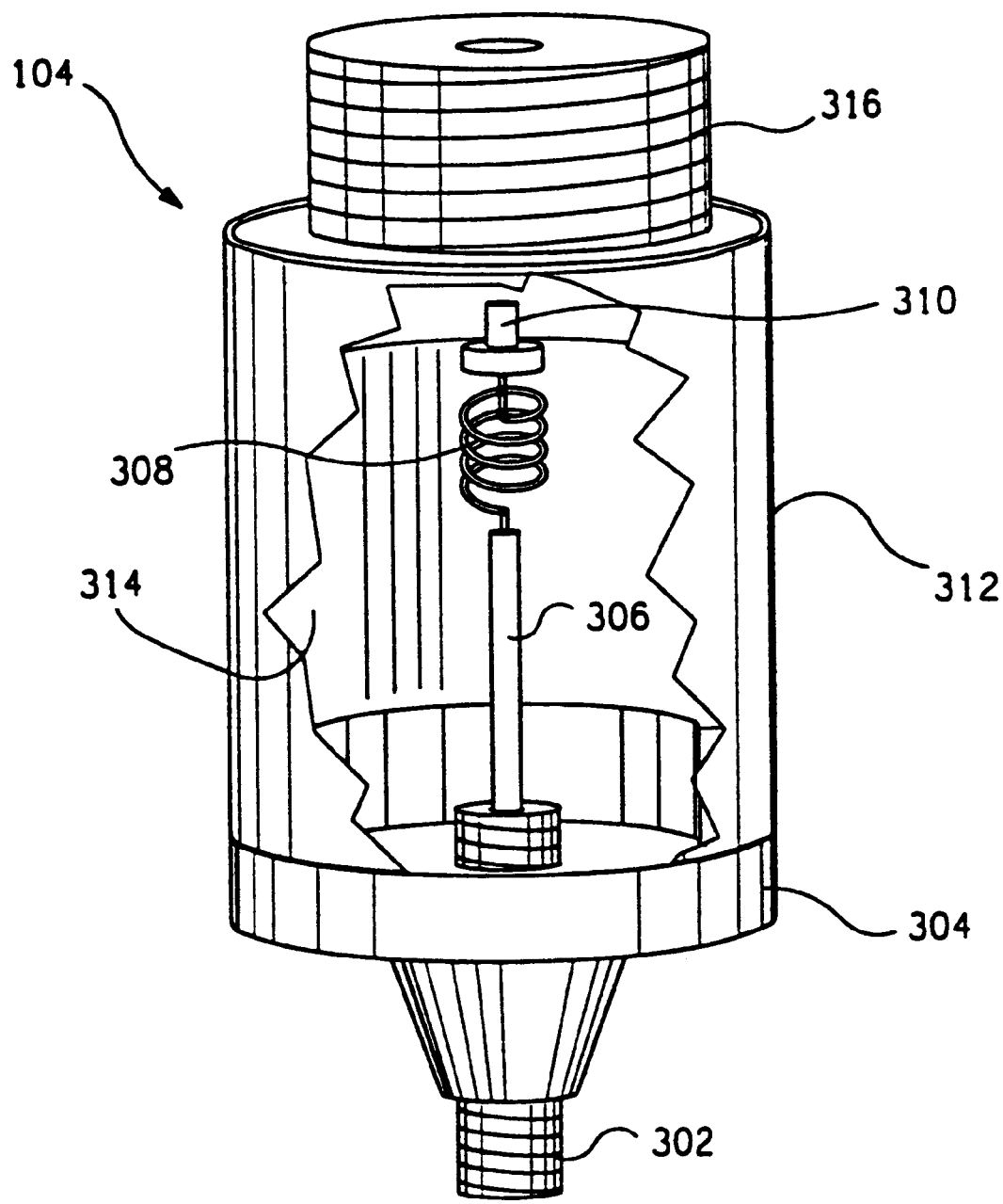
FIG. 4 is a partially broken away side view of an exemplary embodiment of the assembled RF connector of the present invention.

A portable radiotelephone capable for use with the present invention employs an external antenna at a top end, for transmitting RF signals, and an electrical connector or plate contact at a bottom end, for interfacing with a portable radiotelephone battery charging device. FIG. 1A illustrates a side view of the antenna adapter 100 of the present invention. The antenna adapter 100 comprises an elongated member 102 which is electrically conductive. In alternate embodiments, elongated member 102 may be a frame structure made entirely of a conductive material such as metal, or it may be made substantially out of a non-conductive material such as composite plastic, and coated with a conductive material. Also, elongated member 102 may configured as a frame with side members 103 for receiving and "cradling" the portable radiotelephone. Alternatively, elongated member 102 may be simply a wire, although improved RF performance and ruggedness may be accomplished with the frame structure configuration.

At a first end of elongated member 102 is a connector 104. Connector 104 interfaces with the antenna port of the radiotelephone when the external antenna has been removed from the radiotelephone. In a preferred embodiment, connector 104 is a 50 Ω impedance-matched SMA RF connector. However, it is understood that many different connector types standard in the art may be used at the first end of elongated member 102 to accomplish substantially the same result, i.e., connecting the antenna port of the radiotelephone under test directly to the desired RF test equipment, depending on the type of test equipment to be interface with the portable radiotelephone. In a preferred embodiment, connector 104 is coupled to elongated member 102 by means of a connector clip 105. Connector clip 105 is fixedly attached to elongated member 102, and may be an integral part thereof. Connector clip 105 captures connector 104 such that connector 104 is free to rotate about a longitudinal axis so that it may be easily mated to the antenna port of the portable radiotelephone as will be shown in FIGS. 2A and 2B. It is understood that other means of coupling connector 104 to elongated member 102 may be used without the use of inventive faculty.

At a second end of elongated member 102 is an electrical contact 106. In a preferred embodiment, electrical contact 106 comprises at least one electrically conductive pin, capable of making reliable electrical contact with the external battery-charging contacts of a portable radiotelephone which utilizes plate contacts to interface with a battery charging assembly (not shown). However, it is understood that many different types of electrical contacts or connectors standard in the art may be used at the second end of elongated member 102 to accomplish substantially the same result, i.e., providing a RF return path to a ground plane of the radiotelephone under test, depending on the construction and design of the particular radiotelephone under test.

A front view of the antenna adapter of the present invention is illustrated in FIG. 1B. As can be seen from FIG. 1B, electrical contact 106 may comprise two pins. In a preferred embodiment, only one of the two pins is electrically conductive. Such an arrangement would be used where the battery charging ports of the portable radiotelephone comprise two conductive plates, one for power and one for ground. In such a case, the electrically conductive pin of electrical contact 106 would make contact with the ground plate of the battery charging port, whereas the non-electrically conductive pin of electrical contact 106 would make contact with the power plate of the battery charging port. In this arrangement, the non-electrically conductive pin would serve as a means of guiding electrical contact 106 into proper alignment with the radiotelephone, providing further ruggedness. Additionally, one can see from FIG. 1B that elongated member 102 may be configured as a frame for receiving the portable radiotelephone, and shaped to conform to the approximate size and shape of a typical portable radiotelephone.

FIG. 2A illustrates a partially broken away front view of a portable radiotelephone 200 employing the antenna adapter 100 of the present invention. FIG. 2B illustrates a partially broken away side view of the same radiotelephone 200 of FIG. 2A. As can be seen from FIGS. 2A and 2B, connector 104 at a first end of elongated member 102 connects directly to the antenna port at the top end of radiotelephone 200. Also, electrical contact 106 at an opposite end of elongated member 102 makes electrical contact with an exposed ground pad 204 on the battery charging port at the bottom end of radiotelephone 200. When antenna adapter 100 is connected to radiotelephone 200 as illustrated in FIGS. 2A and 2B, antenna adapter 100 and radiotelephone 200 form a single, rugged assembly. It is understood that additional means of providing secure attachment of antenna adapter 100 to radiotelephone 200 may be added without requiring any further inventive faculty.

RF signals generated by radiotelephone 200 are provided the antenna port to connector 104. Connector 104 may be connected via various cables (not shown) that are standard in the art to the desired RF test equipment (not shown). An RF return path is provided through connector 104 and elongated member 102 to electrical contact 106. Electrical contact 106 makes electrical contact with an exposed ground pad on the battery charging port at the bottom end of radiotelephone 200 to provide the ground necessary for proper RF signal measurement.

As can be seen from FIG. 2A, elongated member 102 may be shaped to conform in width to the physical dimensions of radiotelephone 200. Also, as can be seen from FIG. 2B, elongated member 102 may be fashioned as relatively slim in thickness, and conform to the curvature of the physical outline of radiotelephone 200, effectively capturing radiotelephone 200 between connector 104 and electrical contact 106. In this way, antenna adapter 100 is seen to be a non-intrusive means of providing the necessary RF return path, while allowing a user to cradle radiotelephone 200 in the palm of the user's hand. All buttons, speakers, and microphones on the front face of radiotelephone 200 remain accessible, allowing the user to perform a full range of RF functionality testing of radiotelephone 200 while still holding radiotelephone 200 in a natural position.

FIG. 3 illustrates a partially disassembled side view of an exemplary connector 104 of a first embodiment of the present invention. In this exemplary embodiment, connector 104 is a female SMA coaxial connector. A threaded metal lug 302 is bonded inside plastic insulator 304. Threaded metal lug 302 screws into the radiotelephone's 200 antenna port in place of the radiotelephone's 200 normal dipole antenna. The attachment means of lug 302 may be adapted as necessary to interface with the radiotelephone's 200 antenna port, for which various means are known in the art. A center pin 306 is soldered at one end to metal lug 302 and at the other end to inductor 308. Lug 302 and center pin 306 are axially mounted within plastic insulator 304 and extend therefrom. The value of inductor 308 is determined according to the impedance of the antenna match circuit internal to radiotelephone 200. In an exemplary embodiment, inductor 308 is 18 nanohenries. Contact pin 310 is soldered to inductor 308 and makes contact with the center pin on a male SMA connector (not shown) when the male SMA connector is mated to connector 104.

Outer cylinder housing 312 is electrically coupled to elongated member 102 by connector clip 105 (see FIGS. 1A–2B), and captured by connector clip 105 such that connector 104 is free to rotate about its longitudinal axis. Outer cylinder housing 312 is internally threaded, which threads mate with the external threads of plastic insulator 304. As can be seen from the partially broken-away view of connector 104 shown in FIG. 4, outer cylinder housing 312 surrounds and encloses internal cylinder 314 which acts as an RF shield around contact pin 310, inductor 308, and center pin 306. Internal cylinder 314 also serves as a parasitic capacitance, which, in conjunction with inductor 308 provides the desired impedance match. The amount of parasitic capacitance provided by internal cylinder 314 is small. Excessive parasitic capacitance in internal cylinder 314 would cause an undesirable impedance mismatch between the antenna and the desired test equipment. SMA female receptacle 316 is externally threaded at a captured end to mate with the internal threads of outer cylinder housing 312, capturing internal cylinder 314 between SMA female receptacle 316 and plastic insulator 304. SMA female receptacle 316 is externally threaded at an exposed end to mate with a male coaxial connector (not shown) of the desired RF test equipment. Contact pin 310 provides the desired RF signal from radiotelephone 200 to the desired test equipment.

Connector 104 is mounted on elongated member 102 such that the required RF return path to the charging ground on radiotelephone 200 is made. When threaded metal lug 302 is mated into antenna port 202, it forms a rugged and durable connection between antenna adapter 100 and radiotelephone 200, providing an unintrusive means of interfacing radiotelephone 200 with any desired RF test equipment. In the connected position, antenna adapter 100 provides insertion losses of less than 1 dB, and greatly reduces radiated RF leakage over other designs.

Figure 5:
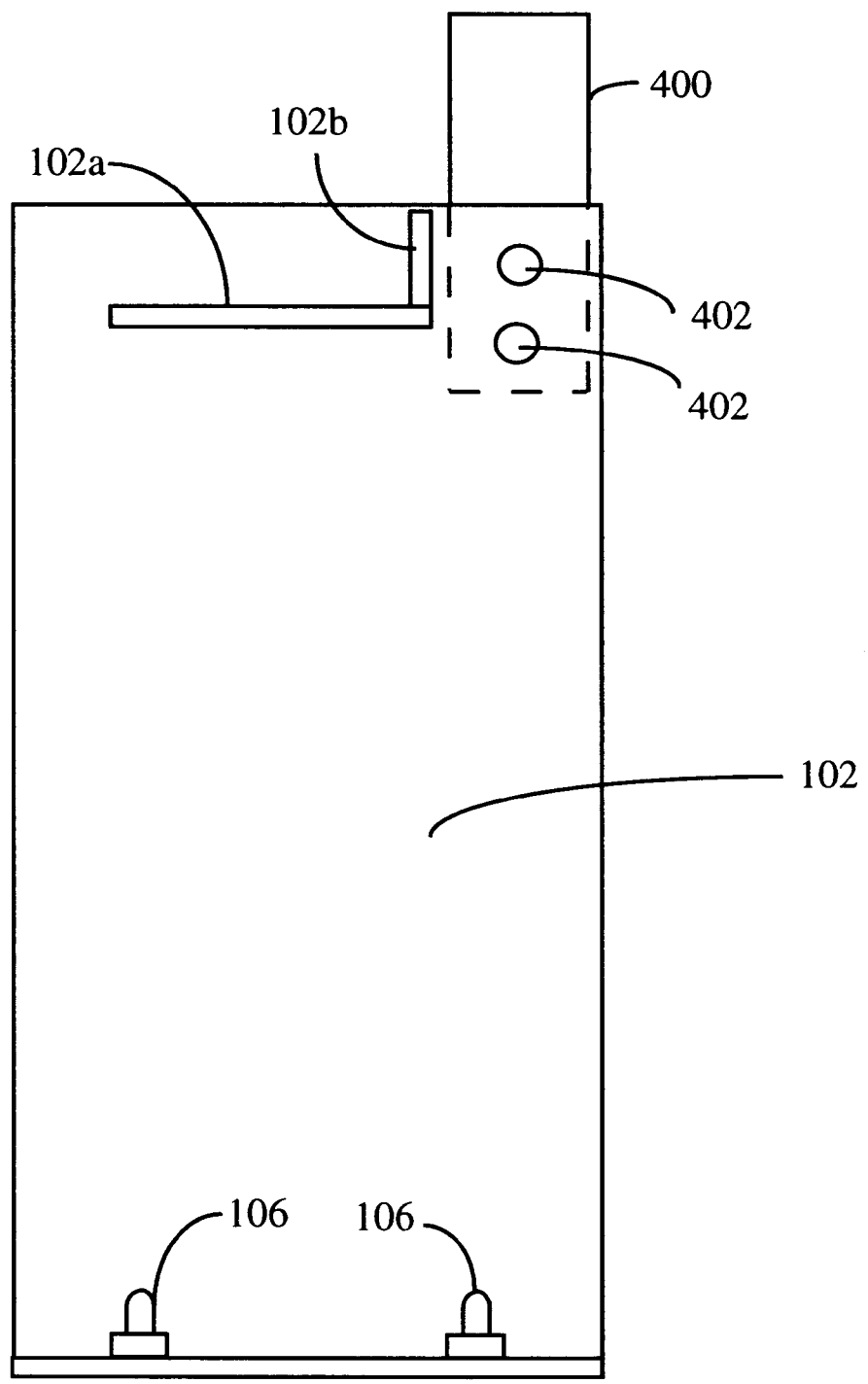
FIG. 5 is a front view of an alternative embodiment of the antenna adapter of the present invention.

Frequent installation and removal of connector 104 can cause fatigue at the solder connection of center pin 306 to metal lug 302 and inductor 308. In an alternative embodiment, electrical-matching components are located external to connector 104. To accommodate externally mounted matching components, circuit board 400 is attached to elongated member 102 by any suitable fastener 402, such as a screw, pop rivet, or the like as illustrated in FIG. 5. Also illustrated in FIG. 5 is an alternative embodiment of elongated member 102. Abutting vertical portions 102a and 102b of elongated member 102 serve to improve the return path for RF energy to the charging ground on radiotelephone 200 (see FIGS. 2A and 2B). Abutting vertical portion 102a is positioned in a substantially parallel arrangement with a top surface 200a (see FIG. 2B) of radiotelephone 200 when the radiotelephone is coupled to adapter 100. Abutting vertical portion 102b is positioned in a substantially orthogonal position with respect to the abutting vertical portion 102a.

Figure 6A:
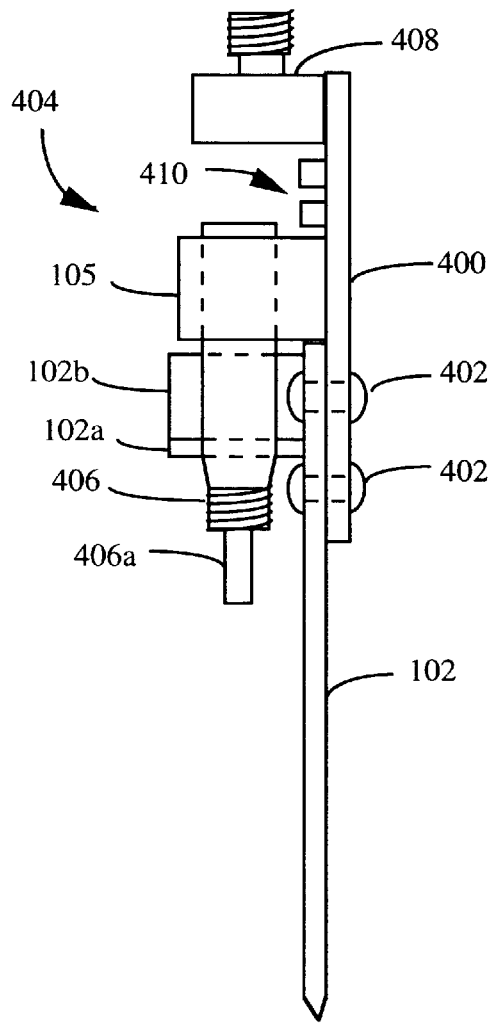
FIG. 6A is an enlarged fragmentary side view of the alternative embodiment of FIG. 5, illustrating the placement of components.

Connectors and electrical-matching components are mounted on circuit board 400. As illustrated in FIG. 6A, circuit board 400 includes connector assembly 404. A first connector portion 406 is designed to mate with the antenna port of radiotelephone 200 when the external antenna has been removed. In this embodiment, connector clip 105 is fixedly attached to circuit board 400. Connector clip 105 captures first connector portion 406 such that first connector portion 406 is free to rotate about a longitudinal axis so that it may be easily mated to the antenna port of portable radiotelephone 200. First connector portion 406 may include shaft 406a having a predetermined length to permit its use as a tuning stub when inserted into the antenna port of portable radiotelephone 200. In an exemplary embodiment, shaft 406a has a length of approximately 0.51 inch. However, the length of shaft 406a may vary, depending on the specific model of the portable radiotelephone 200. Connector assembly 404 also includes second connector portion 408, which is fixedly mounted to circuit board 400. In a preferred embodiment, second connector portion 408 is a 50 ohm, impedance-matched SMA RF connector. However, it is understood that second connector portion 408 may be any of a number of different connector types well known in the art.

Circuit board 400 also includes matching electrical components 410. The specific component of values of matching electrical components 410 are selected to provide a predetermined impedance that matches the impedance of the antenna port of radiotelephone 200 in a selected frequency band. Details of matching electrical components 410 are provided below.

Figure 6B:
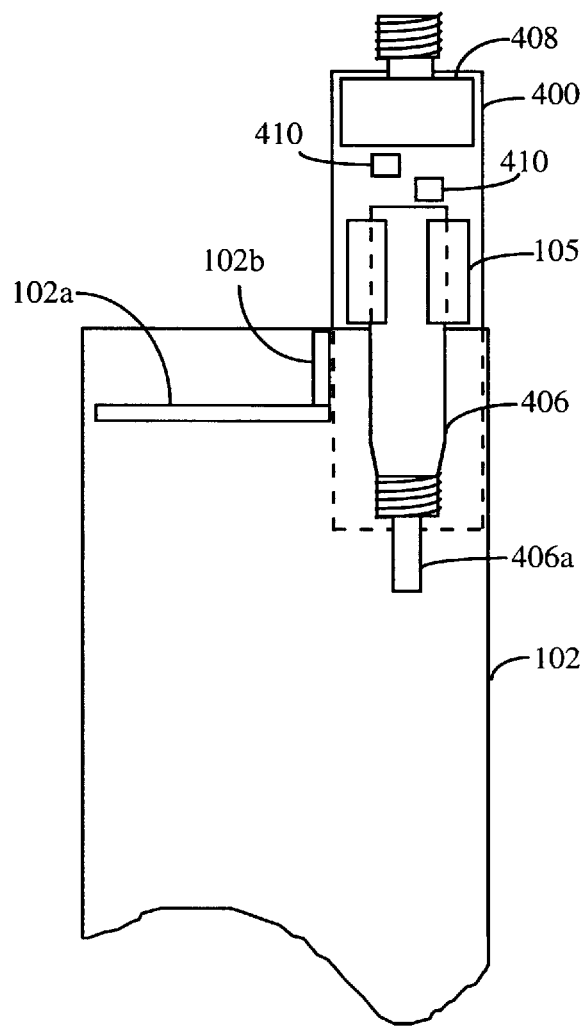
FIG. 6B is a fragmentary front view of the alternative embodiment of the antenna adapter illustrated in FIG. 6A.

FIG. 6B is a fragmentary plane view of antenna adapter 100. In operation, radiotelephone 200 may be engaged with elongated member 102 using electrical contacts 106 (FIG. 5) to electrically couple elongated member 102 to a ground reference point in radiotelephone 200. To complete the installation of radiotelephone 200 in antenna adapter 100, first connector portion 406 is inserted into the antenna port of radiotelephone 200 to thereby retain radiotelephone 200 in engagement with elongated member 102. As noted above, first connector portion 406 is rotatably retained within connector clip 105 to permit the easy insertion of first connector portion 406 into the antenna port of radiotelephone 200. First connector portion 406 provides an electrical connection between the antenna port of radiotelephone 200 and matching electrical components 410.

Figure 7:
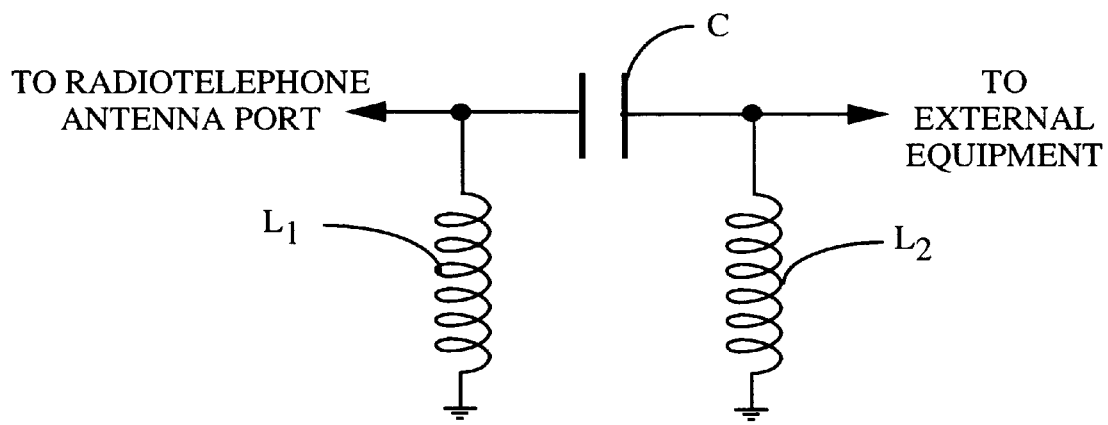
FIG. 7 is an electrical schematic illustrating impedance-matching components of the antenna adapter of the present invention.

An example of matching electrical components 410 is illustrated in FIG. 7. For operation in a first band, such as a cellular telephone band operating at approximately 800 MHz, capacitor C has a value of approximately 2.2 picofarads while inductor $L_1$ has a value of approximately 8.2 nanohenries. For operation in a second frequency band, such as a PCS band operating at approximately 1,900 MHz, capacitor C has a value of approximately 3.3 picofarads, while inductor $L_2$ has a value of approximately 2.2 nanohenries.

The exemplary embodiments of matching electrical components 410 discussed above use lumped, LC-passive electrical circuit components to provide the desired matching. However, those of ordinary skill in the art will recognize that other circuit configurations and component values may be readily employed to provide the desired matching characteristics. In addition to passive components, active matching circuits or passive circuits of different designs may also be used as matching electrical components 410. The present invention is not limited by the specific arrangement or component value selection for matching electrical components 410.

The alternative embodiments illustrated in FIGS. 6A and 6B provide a simple, but rugged, antenna adapter capable of interfacing the antenna port of portable radiotelephone 200 with external test equipment. Tests have indicated that the insertion loss is approximately 2.5 dB over a wide temperature range. Thus, the alternative embodiment of antenna adapter 100 provides a low-cost technique that permits simple testing of portable radiotelephone 200.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for interfacing a radiotelephone with external equipment, the radiotelephone having an external ground and an antenna removably coupled to an antenna port, the apparatus comprising:
   an electrically conductive elongated member having first and second ends, said elongated member being sized to receive and mechanically engage the radiotelephone;
   a matching circuit board mounted on said elongated member at said first end, said matching circuit board containing electrical components to match an impedance of the port;
   a first connector coupled to said matching board to connect to the antenna port when the radiotelephone antenna is removed;
   a second connector coupled to said matching circuit board to connect to the external equipment, said electrical components coupling said first and second connectors; and
   an electrical contact assembly comprising a plurality of electrically conductive pins for connecting to an electrical battery charging assembly, said electrical contact assembly coupled to said elongated member at said second end, for contacting the external ground of the electrical battery charging assembly when the radiotelephone is mechanically engaged with said elongated member.

2. The apparatus of claim 1, further comprising a connector clip, coupled to said elongated member at said first end, for capturing said first connector such that said first connector is rotatable about a longitudinal axis.

3. The apparatus of claim 1 wherein said electrical components comprise a matching circuit to match said antenna port impedance at a selected frequency band.

4. The apparatus of claim 3 wherein said matching circuit comprises at least a first inductor and at least a first capacitor.

5. The apparatus of claim 1 wherein said electrical contact assembly comprises at least one electrically conductive pin and at least one electrically non-conductive pin.

6. The apparatus of claim 5 wherein said first connector and said electrical contact assembly provide mechanical engagement of the apparatus with the radiotelephone.

7. The apparatus of claim 1 wherein said second connector is an impedance-matched coaxial connector.

8. The apparatus of claim 7 wherein said second connector is an impedance-matched SMA connector having an impedance of substantially 50 ohms.

9. An apparatus for interfacing a radiotelephone with external equipment, the radiotelephone having an external ground and an antenna removably coupled to an antenna port, the apparatus comprising;
   an electrically conductive elongated member having first and second ends;
   a circuit board assembly attached to said elongated member at said first end;
   a connector assembly coupled to said circuit board assembly and having a first connector portion to connect to the antenna port when the radiotelephone antenna is removed and a second connector portion to connect to the external equipment;
   electrical components mounted on said circuit board assembly intermediate said first and second connector portions to match an impedance of the antenna port, said electrical components coupling said first and second connector portions; and
   an electrical contact assembly comprising a plurality of electrically conductive pins for connecting to an electrical battery charging assembly, said electrical contact assembly coupled to said elongated member at said second end, for contacting the external ground of the electrical battery charging assembly when the radiotelephone is mechanically engaged with said elongated member.

10. The apparatus of claim 9, further comprising a connector clip, coupled to said circuit board assembly to capture said first connector portion such that said first connector portion is rotatable about a longitudinal axis.

11. The apparatus of claim 9 wherein said first connector portion includes a substantially cylindrical projection extending from said first connector portion along a longitudinal axis of said first connector portion, said projection having a predetermined length designed to provide said antenna port impedance.

12. The apparatus of claim 9 wherein said electrical components comprise passive electrical components to match said antenna port impedance at a selected frequency band.

13. The apparatus of claim 12 wherein said passive electrical components comprise at least a first inductor and at least a first capacitor.

14. The apparatus of claim 9 wherein said electrical contact assembly comprises at least one electrically conductive pin and at least one electrically non-conductive pin.

15. The apparatus of claim 9 wherein said elongated member is sized to receive and mechanically engage the portable radiotelephone, said first connector portion and said electrical contact assembly providing mechanical engagement of the apparatus with the radiotelephone.

16. The apparatus of claim 9 wherein said second connector portion comprises an impedance-matched coaxial connector.

17. The apparatus of claim 16 wherein said second connector portion is an impedance-matched SMA connector having an impedance of substantially fifty ohms.

* * * * *